United States Patent [19]
Regueiro

[11] Patent Number: 5,924,402
[45] Date of Patent: *Jul. 20, 1999

[54] PRE-COMBUSTION CHAMBER FOR AN INTERNAL COMBUSTION ENGINE

[75] Inventor: Jose F. Regueiro, Rochester Hills, Mich.

[73] Assignee: Chrysler Corporation, Auburn Hills, Mich.

[*] Notice: This patent is subject to a terminal disclaimer.

[21] Appl. No.: 08/850,256

[22] Filed: May 5, 1997

Related U.S. Application Data

[60] Provisional application No. 60/038,264, Feb. 24, 1997.

[51] Int. Cl.$^6$ ..................................................... F02B 19/00
[52] U.S. Cl. .......................................... 123/254; 123/293
[58] Field of Search ..................................... 123/254, 270, 123/272, 281, 285, 286, 293

[56] References Cited

U.S. PATENT DOCUMENTS

| 4,044,730 | 8/1977 | Masaaki et al. | 123/293 |
| 4,050,422 | 9/1977 | Noguchi et al. | 123/293 |
| 4,071,001 | 1/1978 | Goto | 123/293 |
| 4,426,966 | 1/1984 | Huther et al. | 123/293 |
| 4,467,759 | 8/1984 | Artman | 123/293 |
| 4,483,291 | 11/1984 | Artman | 123/293 |
| 4,513,708 | 4/1985 | Latsch et al. | 123/263 |
| 5,105,780 | 4/1992 | Richardson | 123/263 |
| 5,392,744 | 2/1995 | Regueiro | 123/262 |
| 5,570,665 | 11/1996 | Regueiro | 123/90.27 |
| 5,778,849 | 7/1998 | Regeuiro | 123/254 |

OTHER PUBLICATIONS

962198 *Advanced Cylinder Head, Valve Train, Combustion and Fuel Systems for High Power–Density Truck Diesel Engines,* Part One: Background, Modern Designs, Opportunities, Simon K. Chen, Jose P. Regueiro pp. 1–13.

*The Mercedes–Benz Four–Valve Diesel,* Automotive Engineering/Jan. 1995, pp. 23–25.

Primary Examiner—Willis R. Wolfe
Assistant Examiner—Hieu T. Vo
Attorney, Agent, or Firm—Kenneth H. Maclean

[57] ABSTRACT

A pre-combustion chamber for an internal combustion engine that is provided with a flow enhancing member which located in the interior of the pre-combustion chamber and permits the pre-combustion chamber to absorb additional heat energy during the combustion cycle while creating more efficient transfer of gases between the main combustion chamber of the engine and the interior of the pre-combustion chamber.

8 Claims, 2 Drawing Sheets

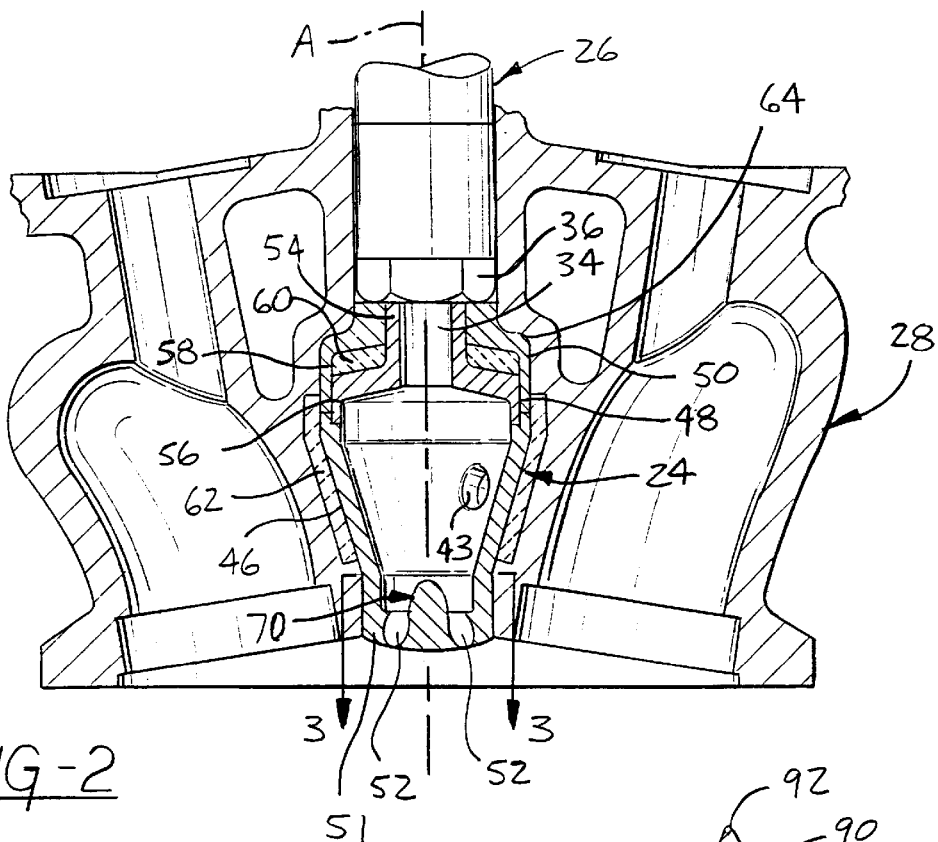
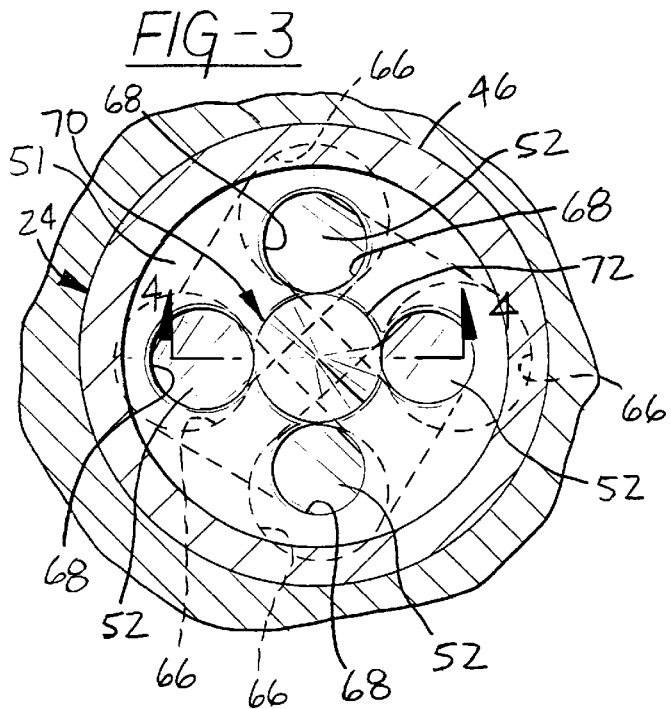
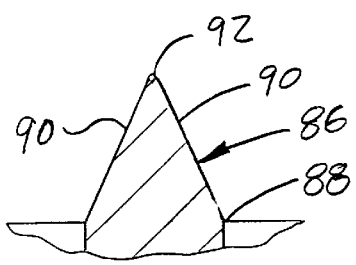
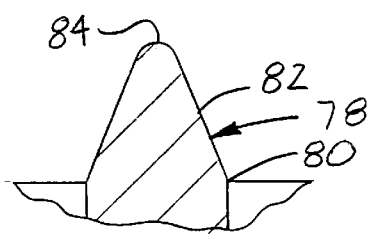
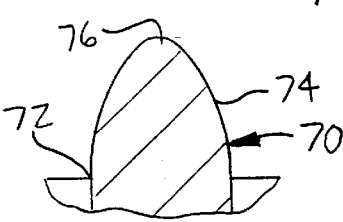
FIG-2
FIG-3
FIG-6
FIG-5
FIG-4

PRE-COMBUSTION CHAMBER FOR AN INTERNAL COMBUSTION ENGINE

This invention is disclosed in and based upon Provisional Patent Application Ser. No. 60/038,264 filed on Feb. 24, 1997 and entitled "PRE-COMBUSTION CHAMBER FOR AN INTERNAL COMBUSTION ENGINE".

FIELD OF THE INVENTION

This invention concerns internal combustion engines and more particularly relates to a pre-combustion chamber that is provided with an improved interior design which permits the pre-combustion chamber to absorb more heat energy during the combustion cycle while causing more efficient transfer of gases between the main combustion chamber of the engine and the interior of the pre-combustion chamber.

BACKGROUND OF THE INVENTION

My U.S. Pat. No. 5,392,744, issued on Feb. 28, 1995 and entitled "Precombustion Chamber For a Double Overhead Camshaft Internal Combustion Engine", describes a pre-combustion system utilizing a central pre-combustion chamber. When this system is combined with a radial valve cylinder head design, an overall improved combustion system for an internal combustion engine can be achieved. However, I believe that two modifications in pre-combustion chamber design can further enhance the operation of an engine; improving its efficiency for increased engine power with reduced fuel consumption and emissions. The first modification involves reducing heat losses through a novel insulation arrangement and such modification is the subject of my two co-pending patent applications identified as P-371 and P-376, each of which is entitled "Insulated Pre-Combustion Chamber". The second modification concerns the pressure losses incurred by the air entering the pre-combustion chamber and the products of combustion and fuel leaving the chamber.

In this regard, it is believed that the flat inside bottom surface of the pre-combustion chamber on which the four transfer passages discharge gases, being a sharp-edge in part, create turbulent eddies because it is a non-aerodynamic design. As a result, the pressure losses incurred in the chamber are increased and reduce the air flow into the chamber during the compression stroke. Worse still, the outflow losses are particularly affected. Since pre-combustion chambers are designed to operate at high temperatures so as to efficiently aid the initiation of ignition and continuation of combustion, it is desirable that its volumetric efficiency be as high as possible and that the air within the chamber at the moment of fuel injection possess the highest energy level. This is necessary because the auto-ignition process of the fuel is a time-temperature function, that is, with the highest temperature, the lowest time. The time delay, therefore, between the beginning of injection and ignition is referred to as "ignition delay". Since during ignition delay, fuel continues to be injected up to and past the moment of ignition, it follows that the longer the ignition delay, the more fuel that is injected during its time span, the more fuel that burns practically simultaneously and immediately following the point of self-ignition. This early ignited mass of fuel produces a sharp chemical noise or detonation, which is also aided by mechanical vibrations incited in the pre-combustion chamber walls and surrounding engine structure. In reality, not much of the energy is transmitted to the piston, crankshaft, and engine block because the heavy explosion is dampened from immediate passage into the main combustion chamber by the transfer passages. The practically simultaneous self-ignition of all the fuel present also increases the $NO_x$ emissions because of all the fuel burnt at this time. In other words, the fuel that has entered the pre-combustion chamber lastly prior to ignition has not mixed well and produces highly localized high-temperature spots that are the genesis of $NO_x$. Hydrocarbons, particulate, and smoke are also produced by these high temperature spots of uncontrollable combustion, since some of this lastly injected fuel may not find air to combust and, instead, pyrolyses as carbon soot which may or may not be burned later within the main combustion chamber. The requirement of this process is, therefore, to reduce the ignition delay as much as possible, limiting the big initial explosion recognized as "diesel knock" (actually a detonation in engineering terms).

Another problem with the extended ignition delay is that the more fuel introduced into the pre-combustion chamber during this period and the more heat of vaporization absorbed by the additional fuel, the more the bulk air temperature within the prechamber is reduced and the more the ignition delay is extended. These are the reasons for the requirement that the pre-combustion chamber be filled with as much air as possible at the highest temperature; two conditions which are hampered by the less than perfect pre-combustion chamber transfer holes at their discharge end into the pre-combustion chamber. One simple solution would be to increase the size of the transfer passages, but this would have repercussions in that it would require an increase in the diameter of the bottom of the pre-combustion chamber. This, in turn, would require a reduction in diameter of valve sizes and limit engine performance. Therefore, the only solution is to increase the coefficient of discharge of the transfer passages and, in effect, make them more aerodynamic and efficient.

It is also believed that the worst effect of the sharp-edged orifices of the transfer passages occurs during the pre-combustion chamber discharge; i.e. when the products of prechamber combustion, fuel and air still burning and the fuel in various stages of decomposition, are rapidly expelled from the pre-combustion chamber into the main combustion chamber. This process also expends pressure energy to induce velocity in the torch-like plumes. Since the kinetic energy generated by the velocity of the plumes is what induces the violent mixing and quick combustion of air in the main combustion chamber, it is desirable to accomplish this process as rapidly as possible with minimum pressure losses. I believe this process can also be expedited by improving the flow coefficient of the transfer passages. These passages were made divergent in the pre-combustion chamber design disclosed in my '744 patent referred to above so as to increase their discharge flow coefficient. However, their discharge flow coefficient can still be further improved by making the entrance to the passages, for the discharge function, more aerodynamic inside the bottom surface of the pre-combustion chamber.

SUMMARY OF THE INVENTION

Accordingly, my solution to the above-described problem consists of the placement of an upright aerodynamic flow enhancing member at the flat inside bottom of the pre-combustion chamber. In the preferred form, the base diameter of the flow enhancing member would be essentially similar to the inner circle formed by the inner holes of the transfer passages. This solution makes it possible to streamline the flow of gases both into and out of the pre-combustion chamber, but would be particularly important during the discharge phase. I also believe that the additional metal mass provided by the flow enhancing member at the bottom of the pre-combustion chamber, being at the center of pre-combustion traffic, will act as a heat sink absorbing some heat energy from the combustion cycle. Such additional heat energy thus stored can then be transferred to the air entering the interior of the pre-combustion chamber in the following engine cycle to further increase the air temperature at the time of ignition. This should further reduce the ignition delay discussed above.

In one form of the present invention, the flow enhancing member located in the pre-combustion chamber has the configuration of a cone extending upwardly from the base portion of the lower section of the pre-combustion chamber. The cone is centrally located in the lower end of the pre-combustion chamber with the transfer passages surrounding the base of the cone. In another form, the flow enhancing member is generally cone-shaped but has a curved convex outer surface beginning at its base and terminating at its apex which also can be curved. In still another form of the present invention, the pre-combustion chamber is provided with a flow enhancing member that is pyramidal in configuration having a polygonal base and triangular sides which meet at a point.

One object of the present invention is to provide a new and improved pre-combustion chamber for an internal combustion engine that has a flow enhancing member located within the inner cell area of the pre-combustion chamber and which fills the area of the base portion between the transfer passages so as to provide sufficient mass for absorbing heat from a combustion cycle while serving to streamline the flow of gas into and out of the pre-combustion chamber.

Another object of the present invention is to provide a new and improved pre-combustion chamber for an internal combustion engine in which the base portion of the pre-combustion chamber is formed with an upstanding flow enhancing member that is surrounded by transfer passages and serves to provide additional surface area and metallic mass for absorbing heat during a combustion cycle and for causing gas to flow into and out of the pre-combustion chamber in a more efficient manner.

A further object of the present invention is to provide a new and improved pre-combustion chamber for an internal combustion engine in which the base portion of the pre-combustion chamber is integrally formed with an upstanding flow enhancing member that has a conical configuration and has the base portion provided with a plurality of transfer passages the open ends of which are located on a common circle with the base of the flow enhancing member.

A still further object of the present invention is to provide a new and improved pre-combustion chamber for an internal combustion engine in which the base portion of the pre-combustion chamber has a plurality of circumferentially spaced transfer passages which surround an upstanding flow enhancing member located along the longitudinal center axis of the pre-combustion chamber and in which insulation means are encapsulated around the pre-combustion chamber so as to reduce heat loss during the combustion cycle.

BRIEF DESCRIPTION OF THE DRAWINGS

The above and other features, objects and advantages of the present invention will be more apparent from the following detailed description when taken with the drawings in which:

FIG. 2 is a cross-sectional view of the pre-combustion chamber taken along line 2—2 of FIG. 1 and showing in part the structure of the cylinder head that encapsulates the pre-combustion chamber;

FIG. 3 is an enlarged plan view of the bottom portion of the pre-combustion chamber taken on line 3—3 of FIG. 2 showing the base of a flow enhancing member which forms a part of the pre-combustion chamber;

FIG. 4 is cross-sectional elevational view taken on line 4—4 of FIG. 3 showing the flow enhancing member which forms a part of the pre-combustion chamber seen in FIG. 2; and FIGS. 5 and 6 are cross-sectional elevational views similar to that seen in FIG. 4 but show modified forms of the flow enhancing member.

DETAILED DESCRIPTION OF THE INVENTION

Figure 1:
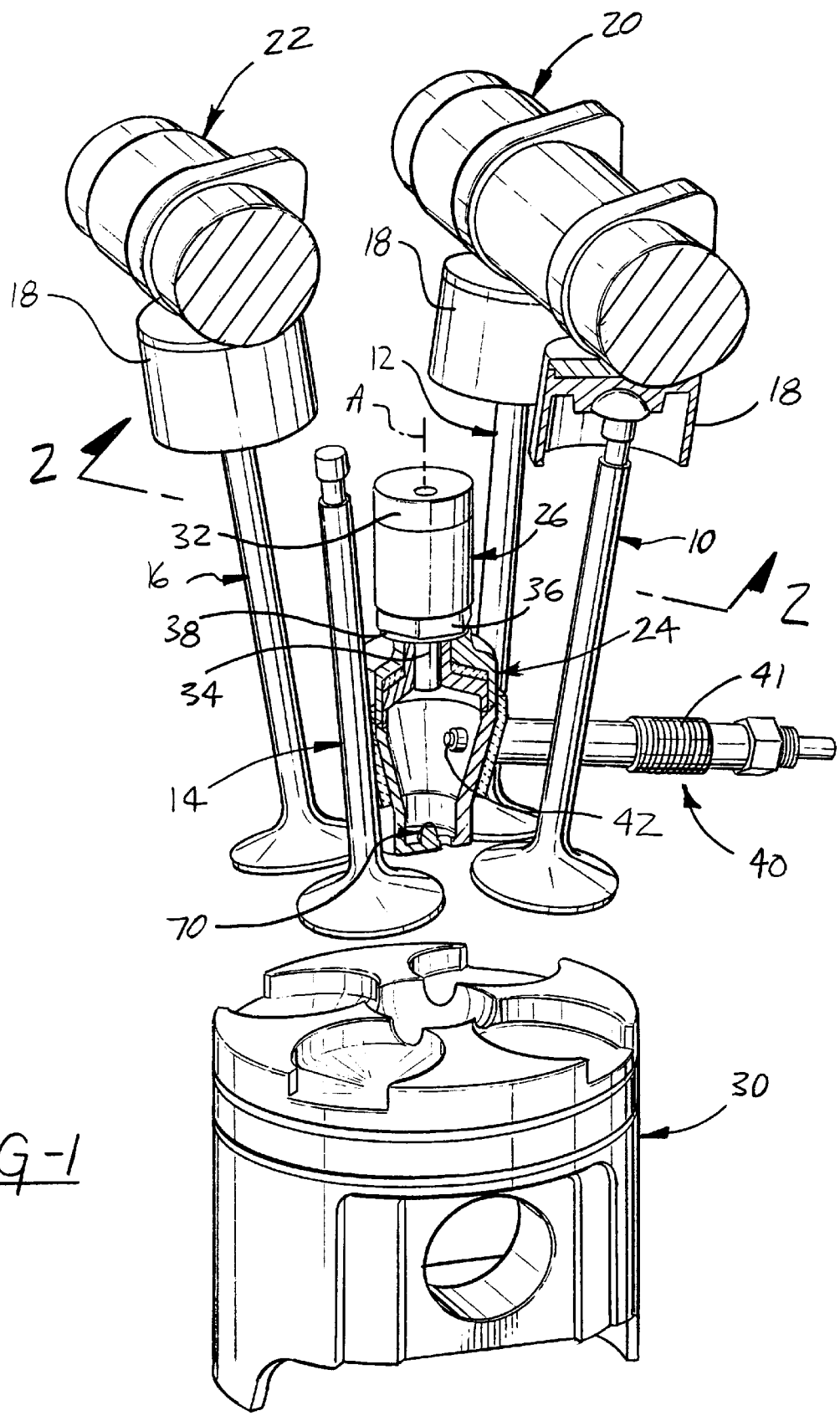
FIG. 1 is a partial isometric view of a pre-combustion chamber in accordance with the present invention installed in a radial-valve cylinder head.

Referring now to the drawings and more particularly to FIG. 1, a partial perspective view is shown of the combustion system components of a four-cycle indirect injection (IDI) engine utilizing four radial valves 10, 12, 14, and 16. The valves 10 and 12 are intake valves while the valves 14 and 16 are exhaust valves each of which is driven directly through a special inverted bucket tappet 18 by double overhead camshafts (DOHC) 20 and 22 as described in my U.S. Pat. No. 5,570,665 issued on Nov. 5, 1996. Although not shown in FIG. 1, it will be understood that the valves 10–16 as well as a pre-combustion chamber 24 and a fuel injector 26 are disposed in a cylinder head 28 (seen in FIG. 2) which is secured to an engine block (not shown). The pre-combustion chamber 24 has its longitudinal center axis "A" substantially centered with the axial centerline of a piston 30 which is disposed for reciprocal movement within a cylinder (not shown) forming part of the engine block. The lower section of the fuel injector 26 is shown, composed of the lower part of a nozzle holder 32 and an nozzle tip 34 firmly attached to the holder 32 by a threadably disposed tip nut 36 engaging the nozzle holder 32. The injector 26 is aligned substantially vertically and centrally with respect to the pre-combustion chamber 24 with a gasket 38 disposed between the flat bottom of the tip nut 36 and the upper flat surface of the pre-combustion chamber 24. The injector 26 can be secured in place by a variety of common means, none of which is shown. Also, common means of supplying fuel to the injector 26 and returning injector leak-off fuel to the fuel tank, are not shown. A glow plug 40 is provided with its tip 42 protruding into the inner cell area of the pre-combustion chamber 24 through a hole 43 formed in the side wall of the pre-combustion chamber 24 as seen in FIG. 2. The glow plug 40 can be inserted through a boss (not shown) integrally formed with the pre-combustion chamber. The large body of the glow plug 40 is secured by threads 41 to another boss which can be cast integrally with the cylinder head 28 of parent-metal such as aluminum or iron.

FIG. 2 is a cross-sectional view taken on line 2—2 passing through valves 10 and 16 and through the cylinder head 28 shown in FIG. 1. For clarity purposes, the valves 10, 16 are not shown in FIG. 2 although the cavities into which these components would be disposed are shown.

More specifically and as seen in FIG. 2, the pre-combustion chamber 24 is encapsulated within the cylinder head 28 and includes three metal parts, namely, a lower housing member 46, an upper housing member 48, and a retainer member 50. The lower housing member 46 is larger in diameter at its upper end than it is at its lower end and terminates with a base portion 51 having a plurality of transfer passages 52 formed therein. The upper housing member 48 is formed with a tubular collar 54 that accommodates the injector tip 34 and is integral with a depending circular stem portion 56. The retainer member 50 has a cylindrical skirt portion 58 merging with an upper ring section which defines a circular opening adapted to mate with and surround the collar 54. The design of the lower and upper housing members 46 and 48 and the retainer member 50 is such as to provide proper alignment of the parts during a joining process (such as electron-beam) so as to provide a metallic single-piece pre-combustion chamber as seen in FIG. 2.

Prior to joining the three metallic parts 46, 48, and 50 of the pre-combustion chamber 24 together, a washer-shaped insulation member 60 is placed over the collar 54 onto the upper housing member 48. The retainer member 50 is then placed over the insulation member 60 and the lower housing member 46 is connected to the upper housing member 48 and the retainer member 50 to provide an interlocking joint. Thus, the insulation member 60 occupies a cavity between the retainer member 50 and the upper housing member 48 and is completely encapsulated between the two metallic members. After welding the three metallic parts of the pre-combustion chamber 24 together, a cone-shaped insulation member 62 is fitted to the lower housing member 46 and bonded or glued thereto using a high temperature resistant adhesive so as to maintain the insulation member 62 in the position shown relative to the lower housing member 46. Once the pre-combustion chamber 24 is combined with the insulation members 60 and 62 as explained above, the entire assembly is than placed in a mold and the cylinder head 28 is then cast around it. In this manner, the pre-combustion chamber 24 together with the insulation members 60 and 62 become part of a single integral unit. The pre-combustion chamber 24 is firmly retained in the cylinder head casting 28, by having part of the casting covering a shoulder 64 of the retainer member 50 and cooperating with the tapered conical design of the lower housing member 46.

As seen in FIGS. 2 and 3, the transfer passages 52 provide communication between the inner cell area of the pre-combustion chamber 24 and the main combustion chamber formed between the top of the piston 30 and the cylinder head 28. The transfer passages 52 are circumferentially equally spaced about the longitudinal center axis "A" of the pre-combustion chamber 24 and can be of the type disclosed in my aforementioned U.S. Pat. No. 5,392,744. Each transfer passage 52 is tapered with its circular open lower end 66 that faces the main combustion chamber being larger than the circular open upper end 63 within the interior of the pre-combustion chamber 24. Also, each transfer passage 52 is angled with respect to the axis "A" such that the larger lower end opening 66 of the passage is spaced at an angle rotated about the axis relative to the smaller upper open end 68 of the passage. For a more detailed description of the passages and their function, reference is made to my '744 patent mentioned above. In addition, reference is made to my SAE Technical Paper Series 960058 entitled "ROTULAR TAPPETS Valve Trains for Hemispherical Combustion Chambers", presented to the SAE International Congress and Exposition, Detroit, Mich. during its 1996 meeting.

With reference to FIGS. 2–4, it will be noted that the base portion 51 of the of the lower housing member 46 is integrally formed with an upstanding flow enhancing member 70 which is generally cone-shaped. The base 72 of the flow enhancing member 70 is circular with the outer surface 74 of the member 70 being curved convexly and terminating at an apex 76 which is slightly curved. As seen in FIG. 3, the base 72 of the flow enhancing member 70 completely fills the space between the open circular ends 68 of the passages 52. The flow enhancing member 70 serves as an aerodynamic cone which straightens the flow during the influx of air from the main combustion chamber into the interior of the pre-combustion chamber 24. More importantly, the flow enhancing member allows the pre-combustion chamber contents to flow out of the pre-combustion chamber to the main combustion chamber with a minimum of pressure losses. The metal bulk of the flow enhancing member 70 also acts as a heat sink to retain the heat of combustion at the end of any combustion cycle of the engine. Afterwards, the retained heat is returned to the pre-combustion chamber inflow in the following cycle in order to increase the temperature and energy level of the air in the pre-combustion chamber. This then reduces the ignition delay period of the first portion of the injected fuel on the successive cycle to produce a faster ignition of the fuel, with less energy released simultaneously and, therefore, less combustion noise with improved engine efficiency and reduced emissions.

FIG. 5 shows a modified form of the flow enhancing member 70 that is identified by the reference numeral 78. In this instance, the flow enhancing member 78 takes the form of a cone having a circular base 80, such as that seen in FIG. 3, and is provided with an outer surface 82 which is straight as seen in FIG. 5. The outer surface 82 is tapered inwardly from the base 80 and terminates at an apex 84 which is slightly curved.

Another modified form of the flow enhancing device can be seen in FIG. 6 and is identified by the reference numeral 86. In this case, the base 88 of the flow enhancing member 86 is polygonal with each side 90 taking the form of a triangle and terminating at a point 92. Obviously, other forms of the flow enhancing member can be provided, the important consideration being that the flow enhancing member serves to eliminate turbulent eddies at the entrance 68 to the transfer passages during the discharge cycle of the pre-combustion chamber 24 and reduces pressure losses. Also, it will be understood that the use of the flow enhancing member of the type described above is not necessarily limited to a pre-combustion chamber in which the transfer passages are configured as described above. In other words, other configurations of the flow control passages can be provided around the flow enhancing member and still realize the advantages described above.

Various changes and modifications can be made in the pre-combustion chambers described above without departing from the spirit of the invention. Such changes and modifications are contemplated by the inventor and, therefore, he does not wish to be limited except by the scope of the appended claims.

The embodiment of the invention in which an exclusive property or privilege is claimed are defined as follows:

1. A pre-combustion chamber for an internal combustion engine having a cylinder and a piston disposed in said cylinder for reciprocal movement relative thereto, a cylinder head over said cylinder and piston to form a main combustion chamber said pre-combustion chamber comprising a housing having a base portion provided with a plurality of transfer passages for communicating said interior of said housing with the main combustion chamber of said engine, said transfer passages being circumferentially spaced about a centerline of said pre-combustion chamber and being tapered so as to have a larger opening adjacent said main combustion chamber and a smaller opening within the interior of said pre-combustion chamber, and an upstanding flow enhancing member located within said pre-combustion chamber and filling the area of said base portion between said transfer passages so as to provide sufficient mass for absorbing heat from a combustion cycle while serving to streamline the flow of gas into and out of said pre-combustion chamber.

2. The internal combustion engine of claim 1 wherein said flow enhancing member has a curved convex outer surface.

3. The internal combustion engine of claim 1 wherein said flow enhancing member has a straight outer surface beginning at its base and terminating at an apex which is slightly curved.

4. The internal combustion engine of claim 1 wherein said flow enhancing member is pyramidal in configuration with a polygonal base and a plurality of triangular sides.

5. In an internal combustion engine having a cylinder and a piston disposed in said cylinder for reciprocal movement relative thereto, a cylinder head over said cylinder and piston to form a main combustion chamber, said pre-combustion chamber located in said cylinder head above said main combustion chamber, said pre-combustion chamber including an upper housing member and a lower housing member, said lower housing member being conical in configuration and having a base portion provided with a plurality of transfer passages formed therein communicating the interior of said pre-combustion chamber with said main combustion chamber, each of said transfer passages having a larger opening adjacent said main combustion chamber and a smaller opening within the interior of said pre-combustion chamber, a generally conical flow enhancing member located in the interior of said pre-combustion chamber and upstanding from said base portion along the longitudinal center axis of said pre-combustion chamber, said flow enhancing member being surrounded by said transfer passages and filling the area of said base portion between said transfer passages so as to provide additional surface area and sufficient mass for absorbing heat during a combustion cycle and for causing gas to flow into and out of said pre-combustion chamber in a more efficient manner.

6. The internal combustion engine of claim 5 wherein said pre-combustion chamber is surrounded by insulation means so as to reduce heat loss from said pre-combustion chamber.

7. The internal combustion engine of claim 6 wherein said pre-combustion chamber includes upper and lower housing members and a retainer member interconnected so as to form a unitary assembly and said insulation means consist of two separate and independent insulation members.

8. The internal combustion engine of claim 7 wherein one of said insulation members surrounds said lower housing member and the other of said insulation members is located between said retainer member and said upper housing member.

\* \* \* \* \*